United States Patent

[11] 3,596,570

| [72] | Inventor | Alexander M. Kenyon |
| | | Cuyahoga County, Ohio |
| [21] | Appl. No. | 856,618 |
| [22] | Filed | Sept. 10, 1969 |
| [73] | Assignee | Towmotor Corporation |
| | | Cleveland, Ohio |

[54] FRICTION-WELDED HYDRAULIC ACTUATOR
26 Claims, 10 Drawing Figs.

[52] U.S. Cl. ............................................... 92/168,
29/156.4, 29/156.5, 29/470.3, 92/169, 92/260
[51] Int. Cl. ........................................................ F16j 1/12,
F16j 11/00, B23p 15/00
[50] Field of Search ............................................ 92/231,
260, 168, 169, 165; 29/156.4, 156.5, 471.1, 470.3;
281/20 P

[56] References Cited
UNITED STATES PATENTS

| 1,216,218 | 2/1917 | Eddowes ................... | 92/260 |
| 2,388,422 | 11/1945 | Krastel ..................... | 92/257 X |
| 2,443,110 | 6/1948 | MacClatchie .............. | 92/253 |
| 2,811,950 | 11/1957 | Entz .......................... | 92/260 X |
| 2,973,744 | 3/1961 | Hennells .................... | 91/26 |
| 2,997,026 | 8/1961 | Zimmerer ................... | 92/169 X |
| 3,065,734 | 11/1962 | Molzahn ..................... | 29/156.4 |
| 3,115,071 | 12/1963 | Strader ...................... | 92/260 X |
| 3,477,115 | 11/1969 | Martin et al. .............. | 29/470.3 |

*Primary Examiner*—Martin P. Schwadron
*Assistant Examiner*—Irwin C. Cohen
*Attorney*—Fryer, Tjensvold, Feix, Phillips & Lempio ABSTRACT: A hydraulic actuator is entirely assembled by means of a plurality of friction welds. The construction permits the elimination of many parts formerly necessary in such actuators, reduces, the possibility of fluid leakage, and reduces the overall length of the actuator as compared with prior art actuators having the same length of stroke.

INVENTOR
ALEXANDER M. KENYON

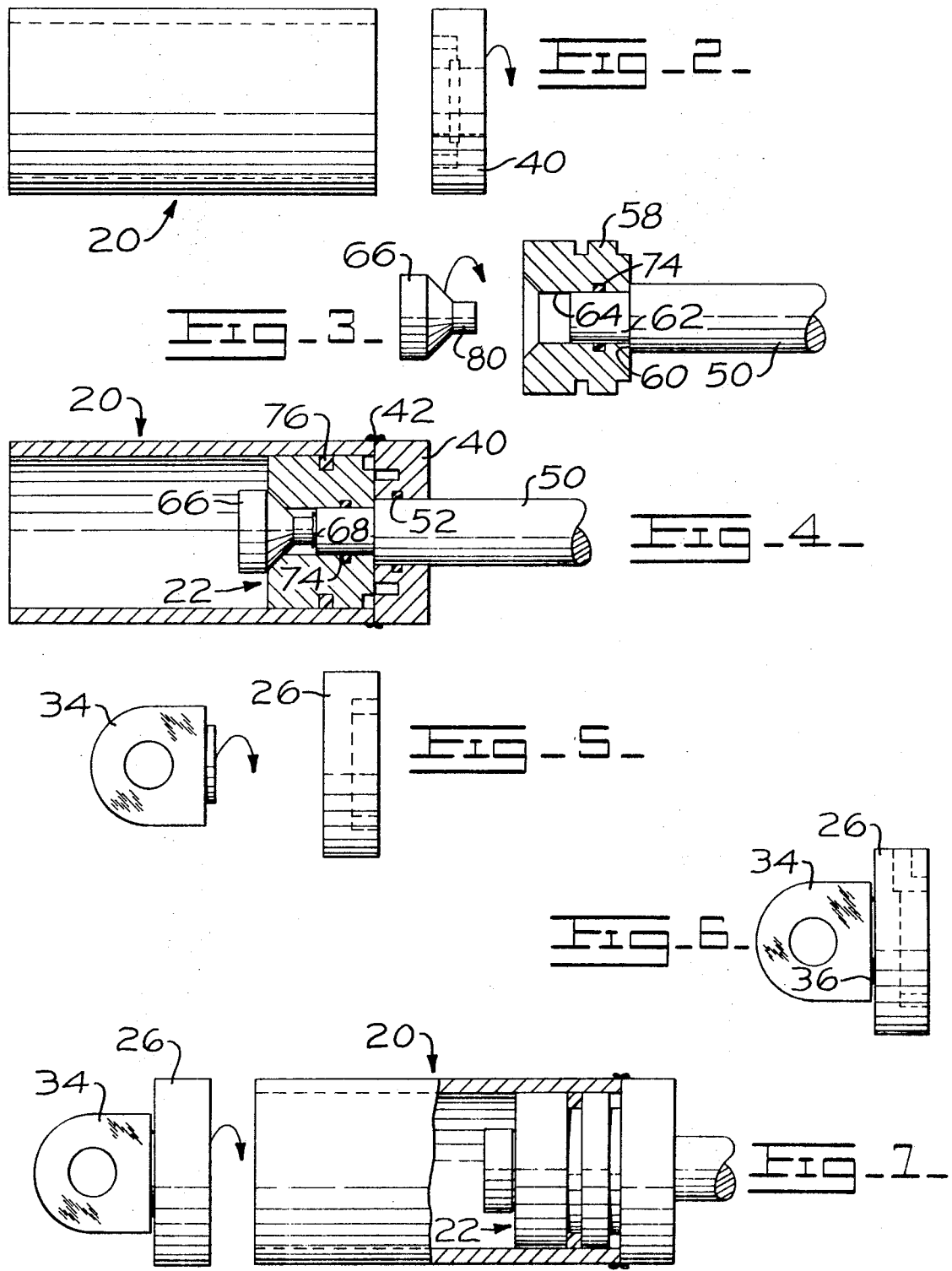

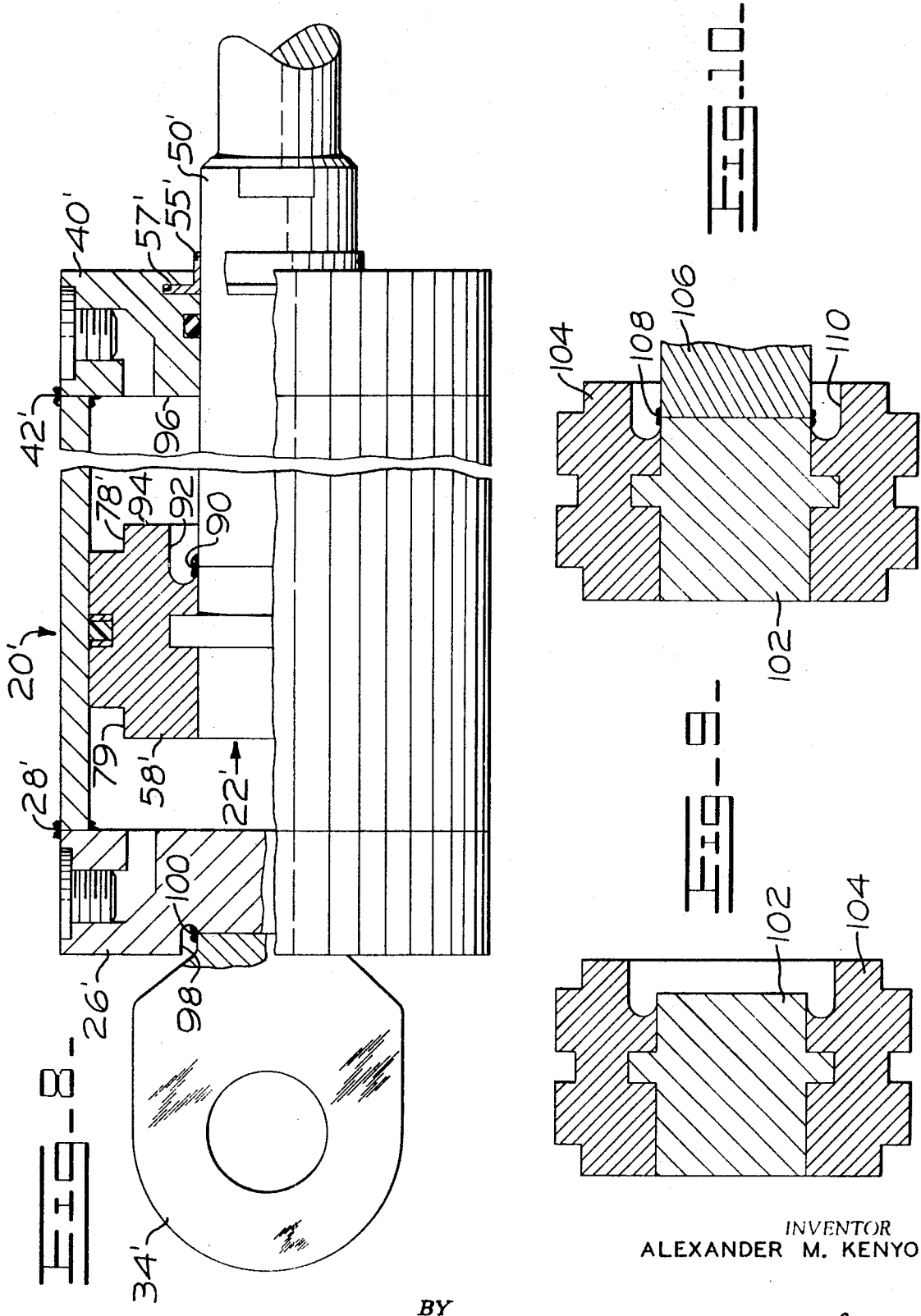

FRICTION-WELDED HYDRAULIC ACTUATOR

BRIEF DESCRIPTION OF THE INVENTION

This invention relates generally to fluid motors and includes double-acting fluid actuators of the type commonly used on lift trucks, earth-moving machines and the like.

The invention is more particularly directed to a hydraulic actuator which is compact, has relatively few moving parts and which may be assembled very easily and very quickly. The invention is specifically directed to a compact hydraulic actuator which is assembled by means of a plurality of friction welds.

The novel hydraulic actuator eliminates the use of many threaded elements, retaining rings, plugs, pins, complex seals and related components and may be constructed very quickly and at a cost low enough that it is intended to be a nonserviceable replacement part which will be replaced entirely in case of failure.

Another advantage of the novel friction welded actuator of the present invention is that due to the elimination of such elements as internal glands and piston rod nuts, etc., the overall unit is shorter. This feature of the invention saves material and also makes it possible to obtain the same length of stroke with a shorter cylinder length.

Since the friction-welded actuator may be constructed at a very low cost and is intended as an entire replacement part, it eliminates problems associated with the stocking of many parts at service areas and unreasonable down time for parts procurement and repairs. Thus, with the present invention if a malfunction develops in the actuator the entire actuator is quickly removed and a new actuator installed in its place. This is not economically feasible with presently existing actuators because of their high initial cost.

The invention also includes a novel and useful piston construction wherein the piston head is friction welded directly to the piston rod. This novel construction eliminates a seal which is necessary in prior art devices as well as eliminating a possible leakage point.

Other and further objects and advantages of the present invention will be apparent from the following description and claims and are illustrated in the accompanying drawings which, by way of illustration, shown preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIGS. 2—7 are schematic views illustrating various sequential steps which are performed in assembling the hydraulic actuator of the present invention;

FIG. 8 is a longitudinal view, partially in section, illustrating details of a modified embodiment of the invention;

FIGS. 9 and 10 are cross-sectional views illustrating a modified embodiment of a piston head and the manner in which a piston rod is secured thereto.

DESCRIPTION OF THE PREFERRED EMBODIMENT

Figure 1:
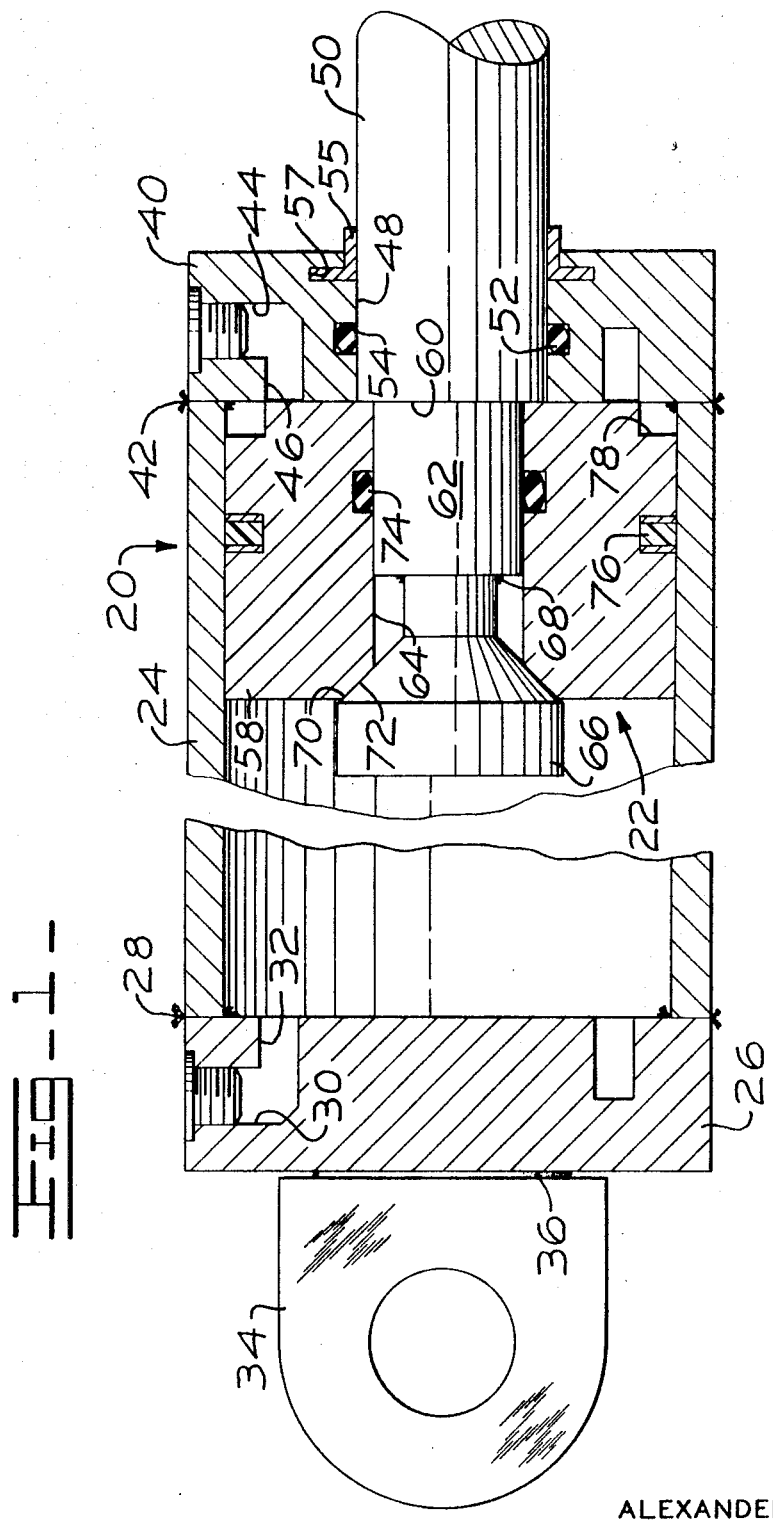
FIG. 1 is a longitudinal view, partially in section, illustrating one embodiment of the friction-welded hydraulic actuator of the present invention.

Referring now to FIG. 1, the hydraulic actuator or motor of the present invention comprises a main cylinder element 20 and a piston assembly 22 slidably carried therein for relative reciprocating movement. The cylinder assembly 20 comprises a cylindrical tube 24 with an internal surface which is relatively smooth. The head end of the cylinder 24 is provided with an end member which is friction welded to the end of the cylinder as shown at 28. The end member 26 is provided with a port 30 which communicates with a circumferential groove or passageway 32 which opens into the cylinder 254 for the admission of pressure fluid to the head end of the cylinder. A clevis 34 is friction welded to the outer face of the end member 26; the friction weld being shown schematically at 36.

The rod end of the cylinder 24 is also provided with an end member 40 which is friction welded to the cylinder as shown at 42. The end member 40 has a port 44 and circumferential groove 46 which communicates with the interior of the cylinder 24 for the admission of pressure fluid to the rod end of the cylinder. The end member 40 is provided with a centrally located hole 48 extending axially therethrough to slidably receive the piston rod 50 of the piston assembly 22. A suitable sealing means, such as an O-ring seal 52, which is received in a groove 54 formed in the end member 40, is provided to permit reciprocation of the piston assembly 22 relative to cylinder assembly 20 without leakage of hydraulic fluid from between the end member 40 and the piston rod 50. Similarly, a wiper assembly 55, preferably of Teflon, is received in a groove 57 and prevents chips, etc., carried on the rod 50 from being carried into the area of the seal 52.

The piston assembly 22 comprises, in addition to the piston rod 50, a piston head assembly 58 which is received on the inner end of the piston rod 50. The piston rod 50 is provided with a shoulder 60 and a reduced-diameter portion 62. When the inner end of the piston rod 50 is assembled to the piston head 58, the reduced-diameter portion 62 of the rod is inserted into a bore 64 formed in the piston head until the shoulder 60 contacts the face of the piston head.

The reduced-diameter portion 62 of the piston rod 50 is then held fast inside the piston head 58 by means of a suitable metal plug 66 which is friction welded to the piston rod as shown at 68. The plug 66 is provided with an external chamfer 70 which matches an internal chamfer 72 on the piston head 58.

It should also be noted that an annular groove 78 is formed on the piston head 58 to prevent travel of the piston head from being prematurely arrested due to contact with flash material protruding from the weld area at 42. This same result could be accomplished by forming a protuberance away from the weld area on either the piston head or inner face of the end member 40. In fact, the plug 66 forms such a protuberance with respect to the end member 26 and serves to prevent the piston head from contacting flash material protruding from the weld area 28.

A suitable seal, such as O-ring 74, is provided between the piston head 58 and the reduced-diameter portion 62 of the piston rod 50. A suitable sealing assembly, such as a double steel-backed T-ring shown at 76 is provided in an external groove of the piston head 58 to prevent fluid leakage between the cylinder head and the internal wall of the cylinder 24.

The novel method of entirely assembling the hydraulic actuator by means of a plurality of friction welds will now be described with respect to FIGS. 2—7. In FIG. 2, the cylinder assembly 20 is held stationary in the chuck of a friction-welding machine (not shown) The end member 40 is chucked in the rotating spindle (not shown) of a friction welder. The end member 40 is then rapidly rotated and the cylinder 20 and end member 40 are forced into engagement under axial pressure to form a friction weld therebetween. This friction weld is best shown at 42 in FIGS. 1 and 4. Of course, it is to be understood that the cylinder 20 could be rotated and the end member 40 held fixed during the friction-welding operation.

Turning now to FIG. 3, the next step in the assembling operation is to place an O-ring seal 74 in an internal ring groove formed in the piston head 58. The reduced-diameter portion 62 of the piston rod 50 is then inserted into the bore 64 until the shoulder portion 60 of the piston rod contacts the end face of the piston head 58. At this juncture, the piston head 58 having the piston rod inserted therein is placed in a nonrotating chuck of a friction welder to prevent rotation of these elements during the welding operation.

The metal plug 66 is then firmly chucked in the rotating spindle of the welder and rapidly rotated. The parts are then forced together under axial pressure so that the end portion 80 of the plug 66 is welded to the face of the reduced diameter portion 62 of the piston rod 50. The friction weld between the metal plug 66 and the piston rod reduced-diameter portion 62 is shown at 68 in FIGS. 1 and 4. The dimensions of the end portion 80 of the plug 66 and the piston rod reduced diameter portion 62 require reasonable machine tolerances to insure adequate length reduction during the friction-welding operation so that the respective chamfers 70 and 72 seat properly and prevent end play of the piston head 58.

The seal assembly 76 is then placed in the external groove formed on the piston head 58 and the O-ring seal 52 and wiper assembly 55 are assembled in the grooves 54 and 57 of the end member 40. After these seals have been properly emplaced, the entire piston assembly 22 is inserted into the main cylinder element 20, as shown in F. 4.

In FIG. 5, the end member 26 is shown being held in a stationary position while the clevis 34 is rapidly rotated. The clevis 34 and the end member 26 are then forced into engagement under pressure to form a friction weld therebetween as shown at 36 in FIGS. 1 and 6.

In FIG. 7, the cylinder assembly 20 having the piston assembly 22 contained therein is held against rotation while the end member 26, having the clevis 34 welded thereto, is rapidly rotated. The end member 26 and the cylinder assembly 20 are then forced into engagement under pressure to form a friction weld therebetween as shown at 28 in FIG. 1. Again, it is to be recognized that the cylinder assembly could be rotated if desired and the end member 26 held in a fixed position. It should also be recognized that the clevis 34 could be friction welded to the end member 26 after the end member 26 has been friction welded to the cylinder assembly 20. FIGS. 8, 9, and 10 illustrate a modified and somewhat simpler embodiment of the invention. In FIGS. 8, 9 and 10 primed (ʹ) reference numerals have been used to denote elements which correspond to similar elements in FIGS. 1—7.

As shown in FIG. 8, the piston rod 50' has been welded directly to the piston head 58' as shown by the weld indicated at 90. This procedure eliminates the use of the end plug 66 shown in the embodiment of the FIGS. 1—7. It should also be noted that a groove or counterbore 92 is formed in the piston head 58'. This groove 92 forms a flash trap which prevents flash material from the weld 90 from protruding beyond the end face 94 of the piston head 58'. If the groove 92 were not provided, then flash material from the weld area might have to be removed by a machining operation. Provision of the groove insures that the flash material will not arrest travel of the piston rod 50' by contacting the inner face 96 of the end member 40' and thereby interfere with proper operation of the actuator.

Another modification of the embodiment shown in FIG. 8 is the provision of a similar groove or counterbore 98 formed in the outer face of the end wall 26'. The groove 98 also serves as a flash trap and provides a neater appearance for the weld 100 which joins the clevis 34' to the end wall 26'.

A still further modification of the embodiment shown in FIG. 8 is the provision on the end face of piston head 58' of an annular groove 79 in addition to the annular groove 78'. As previously mentioned with respect to FIG. 1 these grooves prevent travel of the piston head 58' from being prematurely arrested due to contact with flash material protruding from the welds at 28' and 42'.

It is conventional practice to form the piston head of cast iron material while the piston rod is usually steel. Since it is very difficult to form a strong friction weld between cast iron and steel it has been found desirable to integrally cast a steel insert into the cast iron piston head.

In FIG. 9 a steel insert 102 has been integrally cast into a cast iron piston head 104. In this manner, a steel piston rod 106 may be more easily friction welded to the steel insert 102 of the piston head 104. Such a weld is shown at 108 of FIG. 10 wherein a groove or recessed portion 110 has also been provided to form a flash trap for the weld material.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A hydraulic actuator of the kind in which a piston head on a piston rod reciprocates within a cylinder between end members at opposite ends of the cylinder and comprising, a friction weld between the cylinder and one of the end members and including a bead of flash projecting radially inwardly into the interior of the cylinder, and flash-accommodating means on the piston head for permitting the piston head to move axially within the cylinder into abutment with the end wall without engaging the inwardly projecting bead of flash, whereby the actuator can be assembled and operated without the need to remove the internal flash formed by the friction weld.

2. The invention defined in claim 1 wherein the flash-accommodating means include an annular groove in the outer periphery of the surface of the piston head facing the friction welded end member.

3. The invention defined in claim 1 wherein the flash-accommodating means include an axially extending projection on the central part of the surface of the piston head facing the friction-welded member.

4. A hydraulic actuator assembly as set forth in claim 1 and further including a recessed portion in the center of the piston head where the piston rod is welded to the piston head, said recessed portion forming a trap for weld flash produced by the friction weld.

5. A hydraulic actuator assembly as set forth in claim 1 and further including a friction weld between the piston head and piston rod, a recessed portion on the center of the piston head where the piston rod is welded to the piston head, said recessed portion forming a trap for weld flash produced by the friction weld.

6. A hydraulic actuator assembly as set forth in claim 1 including a friction weld between the piston head and piston rod, and wherein the piston rod is steel and the piston head is formed of cast iron and has a steel insert integrally cast in the center thereof where the piston rod is friction welded thereto.

7. A hydraulic actuator assembly as set forth in claim 1 and further including a central bore formed through the piston head, a portion of said piston rod extending into a first end of the piston head bore, stop means formed between the piston rod and piston head to limit the extension of the piston rod into the piston head bore, and a plug member having a portion extending into a second end of the bore and friction welded to the piston rod to maintain the piston head in a fixed position on the piston rod.

8. A hydraulic actuator which is entirely assembled by friction welding comprising, a cylinder, a first end member friction welded to a first end of the cylinder and having a centrally located hole to receive a piston rod, a second end member friction welded to a second end of the cylinder, each of said end member friction welds having beads of flash projecting inwardly into the interior of the cylinder, a piston assembly reciprocably mounted in said cylinder, said piston assembly comprising a piston head friction welded to a piston rod, and flash-accommodating means on the piston head for permitting the piston head to move axially within the cylinder into abutment with the end walls without engaging the inwardly projecting beads of flash, whereby the actuator can be assembled and operated without the need to remove the internal flash formed by the friction welds.

9. A hydraulic actuator as set forth in claim 8 and further comprising a central bore formed through the piston head, a portion of said piston rod extending into a first end of the piston head bore, stop means formed between the piston rod and piston head to limit the extension of the piston rod into the piston head bore, and a plug member having a portion extending into a second end of the bore and friction welded to the piston rod to maintain the piston head in a fixed position on the piston rod.

10. A hydraulic actuator as set forth in claim 9 wherein the flash-accommodating means include an annular groove formed on the outer extremity of the first end face of the piston head.

11. A hydraulic actuator as set forth in claim 8 wherein the piston rod is steel and the piston head is formed of cast iron and has a steel insert integrally cast in the center thereof where the piston rod is friction welded thereto.

12. A hydraulic actuator as set forth in claim 8 wherein the flash-aaccommodating means include an annular groove formed on the outer extremity of each end face of the piston head.

13. A hydraulic actuator as set forth in claim 8 and further including a recessed portion in the center of the piston head where the piston rod is friction welded to the piston head, said recessed portion forming a trap for weld flash produced by the friction weld.

14. A hydraulic actuator as set forth in claim 13 herein the flash-accommodating means include an annular groove formed on the outer extremity of each face of the piston head.

15. A hydraulic actuator as set forth in claim 13 wherein the piston rod is steel and the piston head is formed of cast iron and has a steel insert integrally cast in the center thereof where the piston rod is friction welded thereto.

16. A hydraulic actuator as set forth in claim 15 wherein the flash-accommodating means include an annular groove formed on the outer extremity of each face of the piston head.

17. A method of making a hydraulic actuator comprising friction welding a first end cap having a centrally located hole to a first end of an open-ended cylinder; friction welding a piston head to a piston rod to form a piston assembly; positioning the piston assembly in the cylinder with the piston rod portion protruding through the hole in the end cap; friction welding a second end cap to a second end of the cylinder forming inwardly projecting beads of flash while friction welding the end caps to the cylinder, and forming the piston head with an axially extending central portion at each end to permit the piston head to travel the full axial distance between the end caps without engaging the inwardly projecting beads of flash, whereby the actuator can be assembled and operated without the need to remove the internal flash.

18. A method of making a hydraulic actuator as set forth in claim 17 including forming an annular groove on the outer extremity of each face of the piston head.

19. A method of making a hydraulic actuator as set forth in claim 17 including forming a recessed portion in the center of the piston head where the piston rod is welded to the piston head, said recessed portion forming a trap for weld flash produced by the friction weld.

20. A method of making a hydraulic actuator as set forth in claim 19 including forming an annular groove on the outer extremity of each face of the piston head.

21. A method of making a hydraulic actuator as set forth in claim 17 wherein the piston rod is steel and the piston head is formed of cast iron and has a steel insert integrally cast in the center thereof where the piston rod is friction welded thereto.

22. A method of making a hydraulic actuator as set forth in claim 21 including forming an annular groove on the outer extremity of each face of the piston head.

23. A method of making a hydraulic actuator as set forth in claim 21 including forming a recessed portion in the center of the piston head where the piston rod is welded to the piston head, said recessed portion forming a trap for weld flash produced by the friction weld.

24. A method of making a hydraulic actuator as set forth in claim 23 including forming an annular groove on the outer extremity of each face of the piston head.

25. A method of making a hydraulic actuator as set forth in claim 17 including forming a central bore in the center of the piston head, inserting a portion of the piston rod into a first end of the piston head bore, forming a stop means between the piston rod and piston head to limit the extension of the piston rod into the piston head bore, and friction welding a plug member extending into a second end of the bore to the piston rod to maintain the piston head in a fixed position on the piston rod.

26. A method of making a hydraulic actuator as set forth in claim 25 including forming an annular groove on the outer extremity of the first end face of the piston head.